Sept. 25, 1934.  J. F. EGGLESTONE  1,974,604
SCAVENGER VALVE FOR ENGINES
Filed Sept. 14, 1932   2 Sheets-Sheet 1

James F. Egglestone
INVENTOR.

BY C. A. Harpman
ATTORNEY

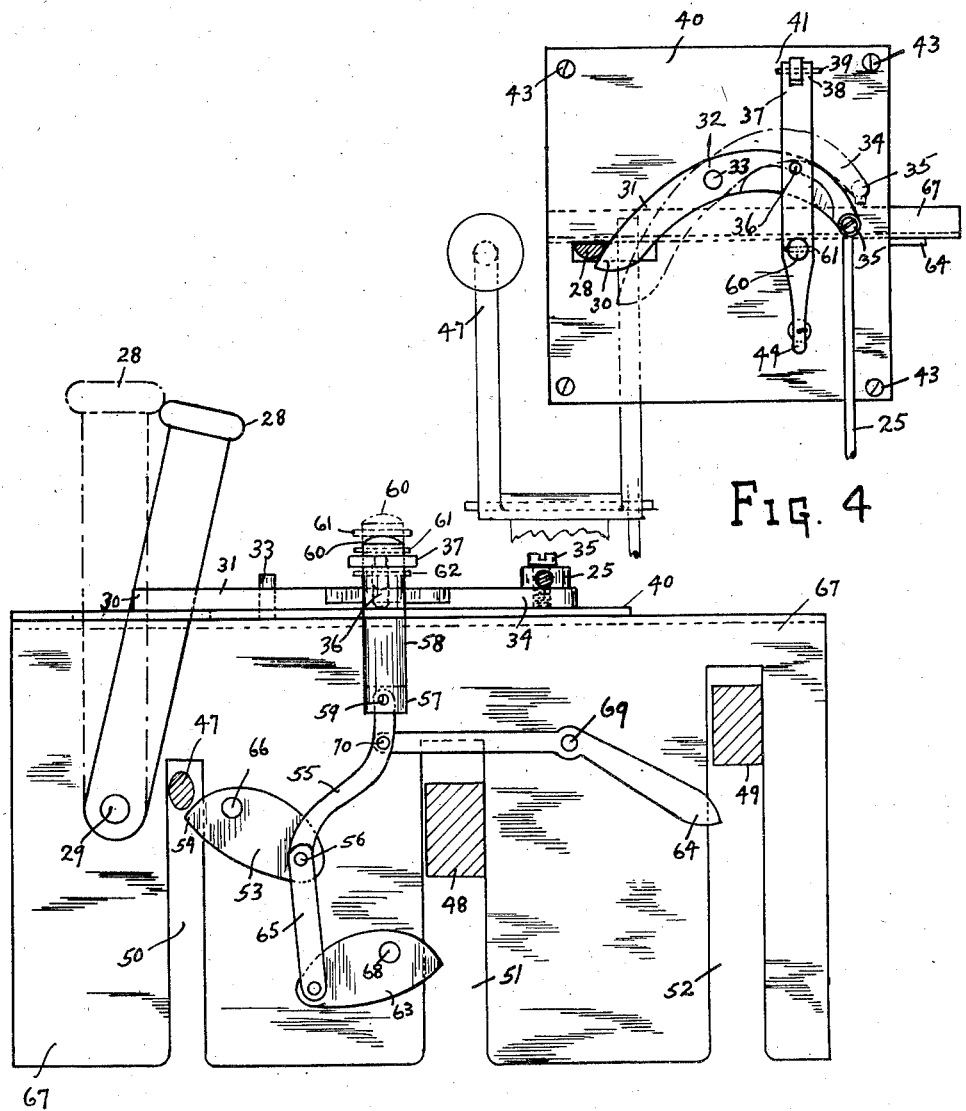

Patented Sept. 25, 1934

1,974,604

UNITED STATES PATENT OFFICE 1,974,604

SCAVENGER VALVE FOR ENGINES

James F. Egglestone, Youngstown, Ohio

Application September 14, 1932, Serial No. 633,200

1 Claim. (Cl. 123—97)

This invention relates to the air intake supply to be carried through a valve to a manifold and into an internal combustion engine in such a manner as to provide for economy in fuel consumption and protection of the engine.

A further object of the invention is to provide means for cooling engine valves and valve seats.

A further object is to provide a cleansing means for a cylinder head of an internal combustion engine whereby carbon, which has accumulated in the cylinders, will be broken up and loosened due to the cooling action of the air coming from the air intake supply through the valve into the manifold and into the cylinder head.

A further object is to provide means for keeping spark plugs practically clear of carbon and in a good working condition.

A further object is to provide means for preventing suction of oil, oil vapor, and the like from the crank case of the engine when the valve admitting air into the internal combustion engine is open. This suction becomes more pronounced when the engine throttle is closed as would be the condition when an automobile is travelling down grade or coasting with a closed throttle.

A further object of the invention is to provide the valve with a relatively large opening and valve seat, this valve being positioned directly above the carbureter fuel passage and on the fuel line between the carbureter and the engine in order that the air valve may supply air directly to the cylinders, thereby eliminating undesirable suction at this time from the carbureter.

A further object of the invention is to provide a quick response of the engine when the throttle is opened and the valve closed, due to action of the incoming air through the valve when the air valve is open which causes a pressure to be maintained against the line leading down to the carbureter. When the valve is closed, shutting off the intake of air, this releases the pressure on the line leading to the carbureter and allows for an initial energetic travel of fuel to the cylinders when the throttle is open.

A further object of the invention is to provide a sufficient quantity of air to the interior of the engine when the throttle has been closed and the valve opened, thereby providing a braking means through air compression in the engine cylinders in place of a normal mixture coming from the carbureter. In this manner of setting up compression in the cylinders of the engine no explosions of combustible gases take place, thereby causing an even and smooth action of the movement of the pistons within the engine.

A further object is to provide a silencer for the valve so that when the valve is open objectionable noises, set up by the in-rush of air through the valve, are silenced to a desirable degree.

A still further object is to provide means for eliminating the danger occurring from the backfiring of the engine in that explosions are prevented from reaching the carbureter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 4 is a detail view of Figure 1 showing a top plan view of an assembly plate and parts connected thereto attached to a floor board of an automobile.

Figure 5 is an enlarged detail view of Figure 1 showing parts as viewed from the rear of the engine backwardly and downwardly upon the floor board, the accelerator, brake, and clutch being shown in cross section.

Figure 1:
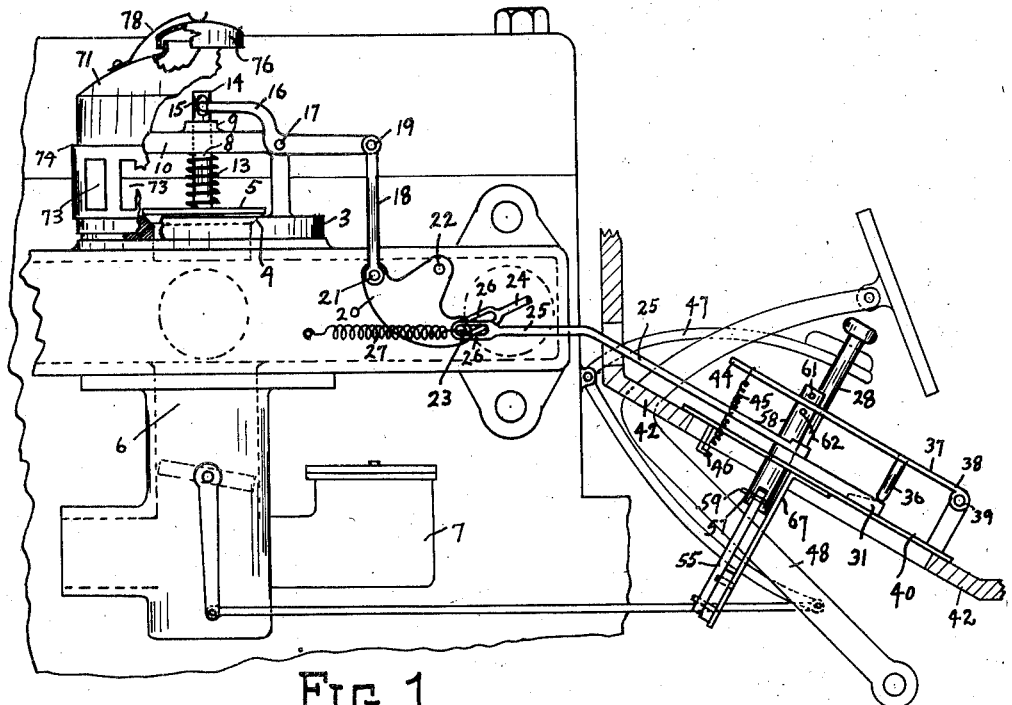
Figure 1 is a side elevation showing the device installed upon an automobile.

By referring to the drawings it will be seen that there is shown an engine block 1. Attached to this engine block 1 there is provided a manifold 2. Upon the manifold 2 there is provided a valve base 3 having a central valve seat 4 for the reception of a relatively large valve 5. This valve 5 is located directly above a fuel passage 6 leading from a carbureter 7. This valve 5 is provided with a stem 8, the upper end of which passes through a central opening in a collar 9 supported by a spider 10 supported by posts 11. This spider 10 is secured to the posts 11 by means of screws 12. There is provided a coil spring 13 through which the valve stem 8 passes. This coil spring 13 is held under compression between the lower side of the spider 10 and the valve 5. The upper end 14 of the valve stem 8 is provided with an opening 15 for the reception of a lever arm 16 which is pivoted by means of a pivot pin 17 and is connected to a link 18 by a pivot pin 19. The lower end of the link 18 is connected to a segment lever 20 by means of a pivot pin 21. This segment lever 20 is provided with a pivot 22. This segment lever 20 is provided with a wrist pin 23 upon which function a hand manipulating rod 24 and a foot manipulating rod 25. It will be seen that these rods 24 and 25 are provided with slotted ends 26 so that either one may act independently of the other. It will be seen that in order that the valve 5 will remain normally seated there is provided an auxiliary coiled tension spring 27 which assists the coil spring 13 in keeping the valve 5 normally closed.

When it is desirable for the operator to manipulate the valve 5 by means of the foot manipulating rod 25 a foot lever 28, which is pivoted at its lower point by means of a pivot pin 29, (see Figs. 4 and 5) is moved so as to come in contact with an end 30 of a curved lever 31 which is pivoted at a point 32 by means of a pivot pin 33. The opposite end 34 of this curved lever 31 is secured in a pivoted manner, by means of a pivot 35, to the foot manipulating rod 25. As the curved lever 31 is caused to move into the dotted position the foot manipulating rod 25 causes, through its connecting parts, the opening of the valve 5. At this time a locking pin 36 is caused to move downwardly and lock the curved lever 31 when in the dotted position as shown in Figure 5, thereby holding the valve 5 open. This locking pin 36 is attached to an under side of a locking arm 37 which is hinged at an end 38 by means of a hinge 39 attached to an assembly plate 40 at a point 41. This assembly plate 40 is secured to a floor board 42 (see Fig. 1) by means of screw 43. An opposite end 44 of the locking arm 37 is normally pulled downwardly by means of a tension spring 45. This tension spring 45 passes through the assembly plate 40 and has its lower end secured to a bracket 46 which is secured to the assembly plate 40.

By referring to Figure 4 it will be seen that the locking pin 36 is now in a locked position holding the curved lever 31 in a locked position, as shown by the dotted lines in Figure 5, with the valve 5 open. The valve 5 will remain in an open position until released by means of any of the selective actions such as depressing an accelerator arm 47, a brake lever 48, or a clutch lever 49. In doing so the accelerator arm 47 would travel downwardly through a slot 50 while the brake lever 48 would travel downwardly through a slot 51, and the clutch lever would travel downwardly through a slot 52. Should the accelerator arm 47 be depressed a cam lever 53 would be caused to move anti-clockwise due to the contact of a portion 54 of the cam lever 53 extending outwardly in the slot 50, this cam lever 53 revolving upon a pivot 66 which is in turn secured to an angle plate 67. This cam lever 53 is secured in a pivoted manner to a connecting rod 55 by means of a pivot 56. The upper end of this connecting rod 55 is connected in a pivoted manner to a lower end 57 of a piston 58 by means of a pivot pin 59. It is obvious that due to the action of the cam lever 53 the connecting rod 55 and connecting parts are caused to move upwardly. An extreme upper end 60 of the piston 58 passes through the locking arm 37 and is held in this position by means of securing pins 61 and 62. This action has carried the locking arm 37 upwardly and raised the locking pin 36, thereby releasing the curved lever 31, which is caused to move upon its pivot pin 33 due to a constant pull of the foot manipulating rod 25 which is in turn actuated by means of the coil spring 13 and the auxiliary coiled tension spring 27, allowing the valve 5 to become seated.

It is also obvious that should the brake lever 48 be depressed and brought in contact with a cam lever 63, a similar action would take place as described when the cam lever 53 was caused to move due to the depression of the accelerator arm 47. This is due to the cam lever 63 being pivoted to the angle plate 67 by means of a pivot 68 and due to the connection of the cam lever 63 to a link 65, the upper end of which functions upon the pivot 56 which moves the connecting rod 55 upwardly.

It will also be understood that when the clutch lever 49 is depressed and brought in contact with a lever 64 a similar action will take place as described when either the cam lever 53 or the cam lever 63 was caused to move due to the depression of the accelerator arm 47 or the brake lever 48. This is due to the lever 64 also being pivoted to the angle plate 67 by means of a pivot 69 and due to its pivot connection 70 on the connecting rod 55.

Figures 2, 3:
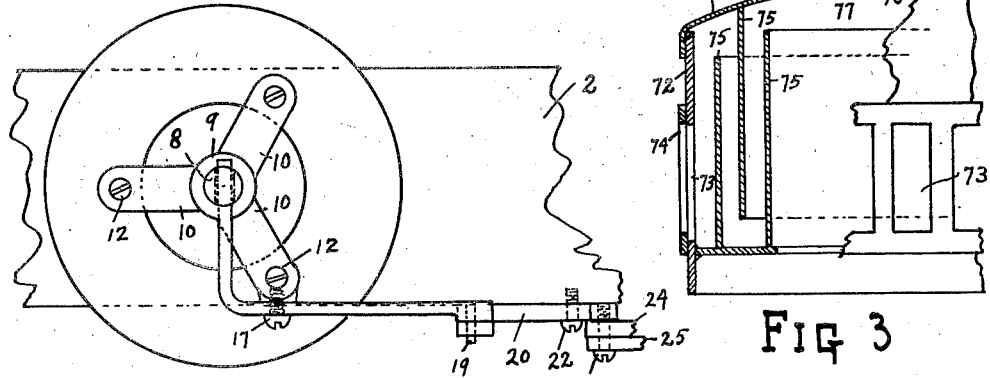
Figure 2 is a detail view of Figure 1 showing a top plan view of the valve and connecting parts.
Figure 3 is a detail view of Figure 1 showing a side elevation of the silencer showing a fragmentary view in cross section.

By referring to Figures 1 and 3 it will be seen that there is provided a silencer 71. This silencer 71 has a circular body portion 72 provided with a plurality of openings 73 and a slidable shutter 74 for the purpose of opening and closing these openings 73. By having a plurality of openings in the circular body portion 72 the operator is able to select the position from which the air is admitted into the silencer. If the temperature of the atmosphere should be extremely low it would be an advantage to admit the air from the closest position to the heated portion of the engine. However, on the other hand, should the temperature of the atmosphere be extremely warm it would be advantageous to take the air into the silencer through those openings farthest from the heated portion of the engine. It is evident that by this selective means the engine may be kept from extremely cold incoming air or extremely hot incoming air in order that the cooling effect on the engine may be desirably regulated. It will be seen by referring to Figure 3 that there is provided a plurality of fins 75 which cause the air to travel through a tortuous path in order to eliminate undesirable noises which would otherwise be heard from the in-rush of air through the valve 5. It will also be seen that there is provided a relatively large hinged cap 76 which is hinged to the silencer 71 at a point 77 directly underneath a keeper spring 78 for the purpose of holding the hinged cap 76 normally in a closed position. Should the engine backfire the pressure exerted in the manifold would lift the valve 5, which is held under relatively light pressure due to the structure of the coil spring 13, and allow for an escape of the exploded gases and combustible material through this cap 76 and selective openings 73 which would otherwise be driven down into the carbureter causing danger of fire or other damaging results.

It is very important that the valve 5 be positioned directly above the fuel passage 6 in order that when the valve 5 is in an open position the in-rush of air will force back and hold any combustible mixture in this fuel passage 6.

One of the important advantages of this device is in that when the valve 5 is seated there is an instant pick-up of the engine due to this liberation of the combustible mixture in the fuel passage 6 which has been held under pressure when the valve 5 was open.

While it is evident that this device will economize in the use of fuel it is more important to provide means for the conditioning of the engine in the removing of undesirable material from the interior of the engine and the spark plugs and in keeping the engine from undesirable heating.

This device provides for a desirable saving in oil being brought up from the crank case such as would ordinarily be done when an engine is coasting or travelling down an incline with the throttle closed. Due to the valve 5 being relatively large air is brought into the manifold and carried into the engine in sufficient quantity to meet the engine's requirements, thereby eliminating all suction from the crank case.

Another important feature of this device is that when the valve 5 is open the fuel stream has been stopped from entering the engine. An air stream entering the valve 5 takes the place of this fuel stream and is compressed within the engine similar to when fuel is used, the engine, therefore, holding the movement of the car in a similar manner. The entering of air into the engine acts in a dual capacity, first, in that the incoming air tends to cool the engine, and second, the compression of the air within the cylinders by the forward movement of the car tends to retard that movement.

What I claim is:—

In a device of the class described, a relatively large air intake valve, said valve positioned on an outside of a manifold directly over a fuel passage leading from a carbureter to an internal combustion engine, foot actuated means for opening and closing said valve, means for holding said valve in open or closed position, a silencer covering said valve, means for regulating incoming air entering said silencer, a hinged cap covering top of said silencer, a spring holding said cap normally in a closed position.

JAMES F. EGGLESTONE.